US007814427B2

(12) United States Patent
Cook et al.

(10) Patent No.: US 7,814,427 B2
(45) Date of Patent: Oct. 12, 2010

(54) OBJECT MODEL TREE DIAGRAM

(75) Inventors: Stephen John Cook, Hertfordshire (GB); Gareth Alun Jones, Cambridgeshire (GB); Stuart John Harding Kent, Kent (GB); Alan Cameron Wills, Newmarket (GB)

(73) Assignee: Microsoft Corporation, Redmond, WA (US)

( * ) Notice: Subject to any disclaimer, the term of this patent is extended or adjusted under 35 U.S.C. 154(b) by 1281 days.

(21) Appl. No.: 11/029,852

(22) Filed: Jan. 5, 2005

(65) Prior Publication Data

US 2006/0150169 A1 Jul. 6, 2006

(51) Int. Cl.
*G06F 3/048* (2006.01)
*G06F 9/44* (2006.01)
(52) U.S. Cl. ............. 715/763; 715/854; 715/861; 717/104; 717/105
(58) Field of Classification Search .............. None
See application file for complete search history.

(56) References Cited

U.S. PATENT DOCUMENTS

| 6,804,686 B1* | 10/2004 | Stone et al. ............. 707/104.1 |
| 7,318,199 B2* | 1/2008 | Nickolayev et al. ......... 715/735 |
| 2002/0199034 A1* | 12/2002 | Beckett et al. ............ 709/328 |
| 2004/0181542 A1* | 9/2004 | Mullins ..................... 707/102 |
| 2005/0114802 A1* | 5/2005 | Beringer et al. ............ 715/968 |

FOREIGN PATENT DOCUMENTS

EP 0747804 12/1996

OTHER PUBLICATIONS

Donald Bell, "UML basic—Part III: The class diagram", 2003, IBM Global Services, pp. 1-13.*
OREAS GmbH, "GoVisual Diagram Editor User Guide, version 1.2", May 10, 2004, pp. 1-41 <http://www.oreas.de/ (obtained from the EU Search Report (European Patent Application No. 05 112 054.1).*
Gutwenger et al., "GoVisual for CASE Tools Borland Together ControlCenter and Gentleware Poseidon—System Demonstration", Springer-VErlag Berlin Heidelberg 2004, pp. 123-128.*
European Search Report dated May 11, 2006 for European Patent Application Serial No. EP05112054, 4 pages.
Boreland Software Corporation. User Guide for Together Control Center, Mar. 24, 2004. ftp://ftpc.borland.com/pub/together/techpubs/tcc62/userGuide.zip.

(Continued)

*Primary Examiner*—Michael J Yigdall
*Assistant Examiner*—Ben C Wang
(74) *Attorney, Agent, or Firm*—Workman Nydegger

(57) ABSTRACT

A designer tool that facilitates design of an object model. The tool takes as input a computer-readable representation of a graph of objects (e.g., classes), and creates automatically one or more diagrams that depict these classes as editable trees showing their relationships and properties. These graphs naturally have a tree-like structure which is exploited by the approach. The design tool system includes a layout component that receives as input one or more of the graphs, and converts the one or more graphs into the editable treelike structure. The system further comprises a presentation component that presents the editable treelike structure as a treelike structure diagram, and facilitates user interaction therewith. The tool can be used for opening, editing and saving existing object model files or to create new ones.

20 Claims, 10 Drawing Sheets

OTHER PUBLICATIONS

No Magic Inc. Magic Draw User's Manual version 8.0. Sep. 2004. http://www.magicdraw.com.

OREAS GMBH. Go Visual Diagram Editor User Guide Version 1.2. May 10, 2004, Koln, Germany. http://www.oreas.de.

OREAS GMBH, Shows publication date of GoVisual Diagram Editor User Guide. May 10, 2004, Koln, Germany. http://www.oreas.de/news.php. Last accessed Mar. 7, 2006.

CN OA dated Dec. 26, 2008 for CN Application No. 200510129091.X, 52 pages.

"User Guide for Together ControlCenter" [Online] Mar. 24, 2004, Borland Software Corporation, XP002371380 Retrieved from the Internet: URL:ftp://ftpc.borland.com/pub/together/techpubs/tcc62/userGuide.zip.

"Magic Draw User's Manual version 8.0" [Online] Sep. 2004, no Magic Inc., XP002371389 Retrieved from the Internet: URL:http://www.magicdraw.com.

"Go Visual Diagram Editor User Guide Version 1.2" [Online] May 10, 2004, OREAS GMBH, Koln, Germany, XP007900199 Retrieved from the Internet: URL:http://www.oreas.de/.

"Show publication date of GoVisual Diagram Editor User Guide (XP007900199)" [Online] May 10, 2004, OREAS GMBH, Koln, Germany, XP002371399 Retrieved from the Internet: URLhttp://www.oreas.de/news.php [retrieved on Mar. 7, 2006].

* cited by examiner

OBJECT MODEL TREE DIAGRAM

TECHNICAL FIELD

This invention is related to the presentation of diagrams, and more specifically, to the presentation of class diagrams in software-related tools.

BACKGROUND OF THE INVENTION

As the strategic value of software increases for many companies, software vendors continually seek out new techniques to automate the production of software and to improve quality and reduce cost and time-to-market. These techniques include component technology, visual programming, patterns and frameworks. As the complexity of software systems increase in scope and scale, companies seek techniques to manage and solve such complexities, which include recurring architectural problems, such as physical distribution, fault tolerance, replication, security, concurrency and load balancing. Additionally, the development for the Internet, while making some communications exchanges much simpler, exacerbates these architectural challenges.

One conventional technique called the Unified Modeling Language (UML) was designed to respond to these needs. The UML is a standard language for specifying, visualizing, constructing, and documenting the artifacts of software systems, as well as for business modeling and other non-software systems. The UML tool is used in developing object-oriented software and the software development process, and uses graphical notations to express the design of software projects.

One useful software architectural representation is a class diagram. A class diagram presents a graphic presentation which describes the static structure of the symbols in a system, and shows a collection of declarative (static) model elements, such as classes, types, and their contents and relationships. Classes are arranged in hierarchies that share a common structure and behavior, and are associated with other classes. Class diagrams model class structure and contents using design elements such as classes, packages and objects, and also displays relationships such as containment, inheritance, associations and others. A class, in the jargon of object-oriented programming, is an element that defines the structure and behavior of a set of objects in an object-oriented program. In an object-oriented application, classes have attributes (member variables), operations (member functions) and relationships with other classes.

Using UML to depict class diagrams has several limitations, as follows: laying a UML class diagram out automatically is a difficult algorithmic problem which rarely gives very satisfactory results; laying a UML class diagram out manually is time-consuming, especially with respect to limiting line crossing, and in placing semantically-significant adornments so that their meaning is readily apparent; a UML diagram of a set of classes pays little regard to the fact that these classes may naturally be organized in a tree structure; and finally, there is no systematic way to expand and collapse areas of a UML diagram.

Another popular approach to defining grammars is Backus-Naur Form (BNF). BNF and its extension Extended BNF (EBNF) are textual approaches to grammar definition used extensively in the formalization of programming languages. However, such conventional developmental tools such as UML, BNF, and EBNF, for example, are fraught with limitations that fail to satisfy a substantial unmet need in the art for development tools.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises an architecture that takes as input a computer-readable representation of a graph of objects (e.g., classes), and creates automatically one or more diagrams that depict these classes as editable trees showing their relationships and properties. The approach is particularly intended for the definition of graphs of classes that represent concepts that define domain-specific languages. Such graphs are often called object models, domain models, meta-models, abstract syntax or grammars. These graphs naturally have a tree-like structure which is exploited by the approach. The approach can also be applied to any kind of object model where directed relationships are important. Furthermore, there is provided the capability to deal substantially simultaneously with different kinds of directed relationships, e.g., embedding, reference, inheritance, and others, such as dependency.

The invention takes into account the interactive capabilities of modern computer systems to assist with the process of formalizing a grammar. These interactive capabilities fall broadly into three areas: reorganizing the diagram to see the desired parts (e.g., via expanding/collapsing, moving objects around, and showing tool tips), searching, and using cues (e.g., color) that are difficult in the printed medium. The approach provides at least the following benefits: diagrams are laid out automatically, rather than by hand; diagrams are compact and efficient in their use of display real-estate; line crossing is avoided; sections of the diagram can be expanded and collapsed; tidy and readable placement of line adornments is automatic; diagrams illustrate the natural treelike structure of the underlying graph; and editing is straightforward.

In support thereof, there is provided a design tool system that facilitates design of an object model in accordance with the subject invention. Given a computer-readable representation of one or more graphs of objects (e.g., classes) that comprise directed relationships, the system automatically creates one or more object diagrams (e.g., a class diagram) that depict these object diagrams as editable treelike structures showing object relationships and properties. The system further can include a layout component that receives as input one or more of the graphs, and converts the one or more graphs into the editable treelike structure. A presentation component can be employed that presents the editable treelike structure as a treelike structure diagram, and facilitates user interaction therewith. The tool can be used for opening, editing and saving existing object model files or to create new ones.

In yet another aspect thereof, an artificial intelligence component can be employed to perform a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is

DETAILED DESCRIPTION OF THE INVENTION

Figure 1:
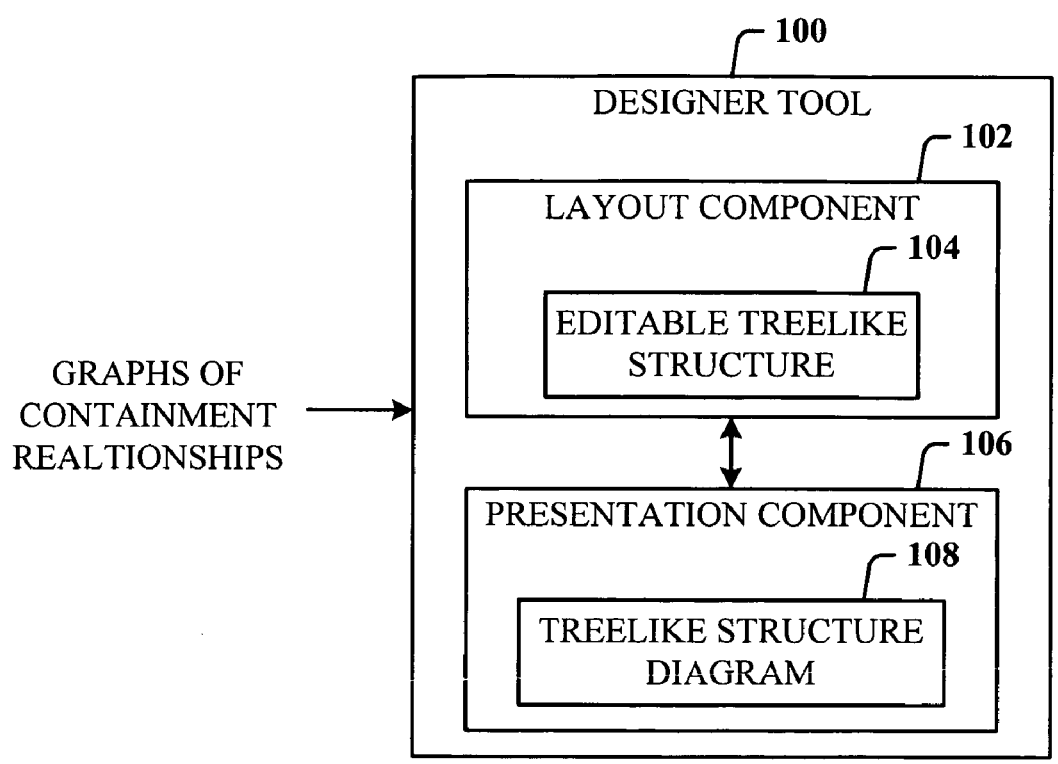
FIG. 1 illustrates a design tool system that facilitates design of an object model in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a design tool system 100 that facilitates design of an object model in accordance with the subject invention. Given a computer-readable representation of one or more graphs of objects (e.g., classes) that comprise directed relationships, the system 100 automatically creates one or more object diagrams (e.g., a class diagram) that depict these object diagrams as editable treelike structures showing object relationships and properties. In support thereof, the system 100 further includes a layout component 102 that receives as input one or more of the graphs, and converts the one or more graphs into the editable treelike structure 104. The system 100 further comprises a presentation component 106 that presents the editable treelike structure 104 as a treelike structure diagram 108, and facilitates user interaction therewith. The tool can be used for opening, editing and saving existing object model files and/or to create new ones.

The novel approach is particularly useful for the definition of graphs of classes that represent concepts that define domain-specific languages. Such graphs are often called object models, meta-models, domain models, abstract syntax or grammars. These graphs naturally have a treelike structure which is exploited. It is to be appreciated by one skilled in the art that the disclosed novel approach can be applied to any kind of object model where directed relationships are important.

Figure 2:
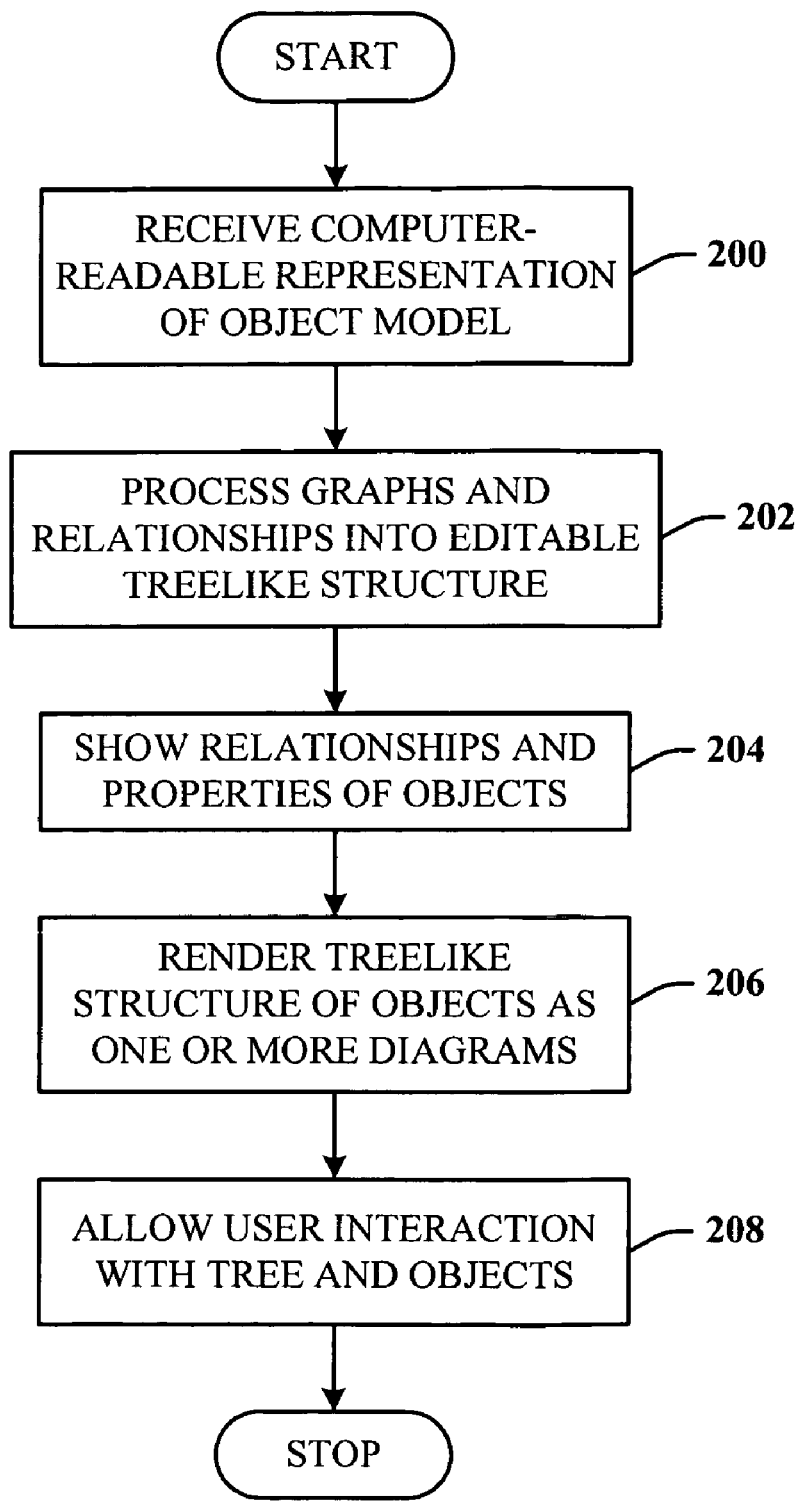
FIG. 2 illustrates a methodology of facilitating object model design in accordance with the invention.

FIG. 2 illustrates a methodology of facilitating object model design in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, the designer tool system receives the computer-readable representation of the object model in the form of graphs that include one or more different kinds of directed relationships. At 202, the designer tool exploits the underlying tree structure of the graphs and, processes the graphs and relationships into a single editable treelike structure of objects (e.g., class objects). At 204, the structure depicts relationships and properties of the objects. At 206, the treelike structure of objects can be rendered to the user as a single object diagram or rendered to the user in parts over several diagrams that are accessed by the user.

For example, the structure can be parsed into separate diagrams, a diagram of references and embeddings, and another diagram of inheritances. Alternatively, the single structure can be parsed into two substructures presented on corresponding diagrams. At 208, the treelike structure is made interactive such that the user can perform a number of different operations. The operations include adding and deleting objects (e.g., classes), processing binary and inheritance relationships of the objects, collapsing (or contracting) and expanding the relationship hierarchy, interacting with properties, repositioning objects and object properties and, searching and navigating among the objects.

Figure 3:
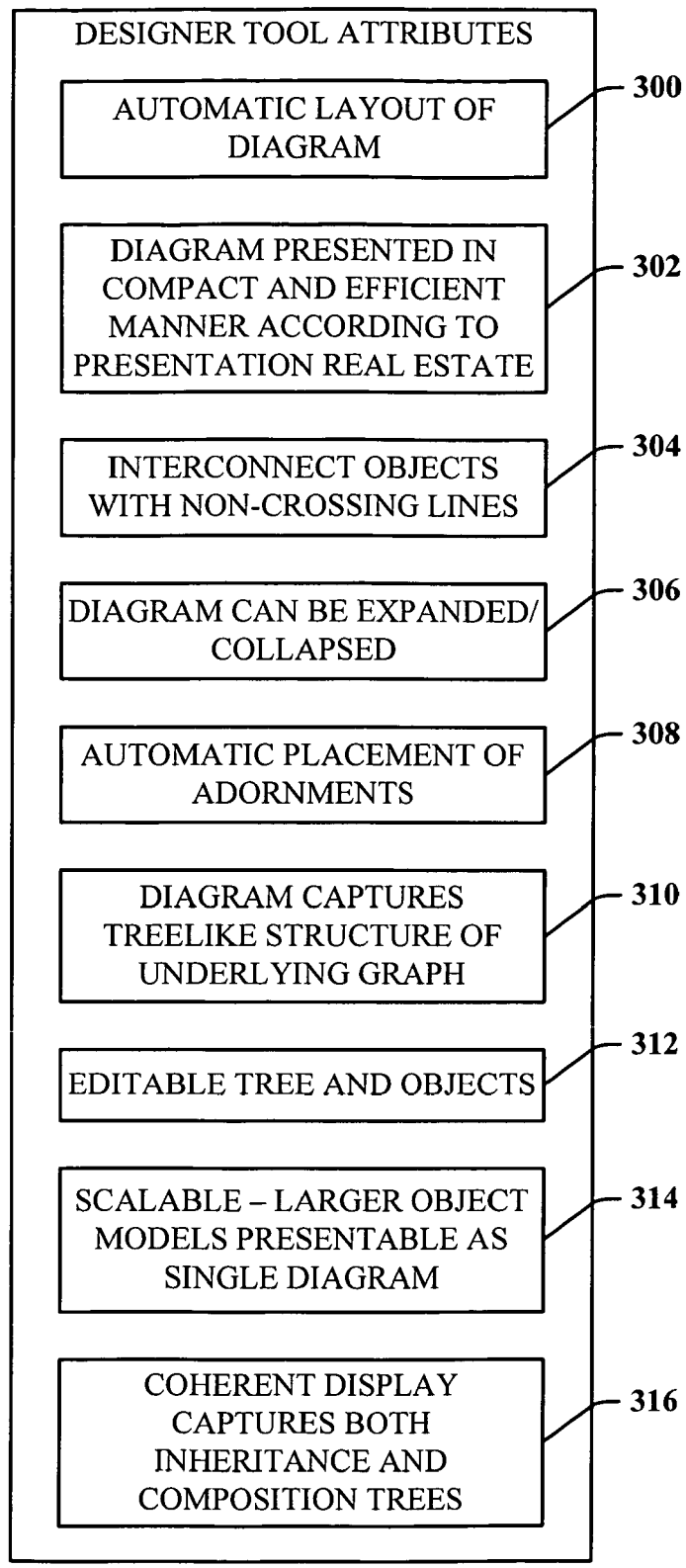
FIG. 3 illustrates attributes of the designer tool of the invention.

Referring now to FIG. 3, there are illustrated attributes of the designer tool of the invention. Each of these will be described additionally hereinbelow in conjunction with FIG. 5. At 300, diagrams are laid out automatically, rather than manually as in conventional systems. The main task of the user is to input what the objects are (e.g., classes) and their relationships, and the tool lays out the structure accordingly. Nevertheless, some layout rearrangements can be made by the user. For example, the user can indicate what objects are to be displayed on the left side of the structure, and in what order subsidiary nodes appear. Everything else, such as spacing, positioning of labels, sizes of objects and structure, and shapes of lines is determined automatically. Organization naturally flows from the top leftmost corner of the treelike structure from a root node (or object). By doing so, the structure indicates that one object can contain other objects. The left to right flow of the treelike structure is driven by directional relationships such as embedding, reference or inheritance relationships. There can be many such trees on the overall depiction. Language definitions in particular have that kind of structure. Thus, the disclosed designer tool supports such language development.

Contrasting this with the conventional Unified Modeling Language (UML) tool, UML has no notion of a treelike structure, but is simply about objects and relationships between objects. UML presents the same node and lines between the nodes. However, from the root node at the top leftmost corner emanates a splay of lines underlying nodes that must be input manually, and in an order that is defined manually by the user.

At 302, another tool attribute is that the structure diagram is presented in a compact and efficient manner in accordance with the presentation real estate. One reason this can be accomplished automatically is that the lines between the various nodes are channeled. This is made possible by placing the labels and other adornments in the middle of lines rather than near or at the line ends. For example, the root node is connected to other nodes at a single point, as are the other nodes of the treelike structure. Additionally, the labels (a line adornment) are arranged on lines to further facilitate compactifying the diagram.

At 304, nodes (or objects) are interconnects with lines that do not cross one another. This is accomplished by providing one place in the structure where an object is defined, and then replicating that node at other structure locations. These other locations then reference the object definition location. Instead of drawing lines from any node back to a single node, a single referencing node is provided at each node to reduce the line confusion normally associated with UML. As noted with conventional tools, when multiple lines begin or terminate at multiple points of a node, the likelihood of line crossing increases considerably.

Another attribute of the designer tool, which is part of the interactive aspect, is that sections of the structure can be expanded or collapsed, as indicated at 306. This allows the user to view the structure in different ways, e.g., to focus on one section more than another. Any of the lines that route away from one of the nodes emanates from a graphic symbol (referred to hereinafter, as a twicky). The user need only select the twicky to expand or collapse the underlying subtree sections.

At 308, the tool facilitates the tidy and readable placement of line adornments. For example, line labels such as Employees, Leaders, and Teams are automatically positioned proximate to the corresponding line. Moreover, a role relationship symbol (a "diode-like" symbol) is moved away from the terminating line end. Conventional tools pushed the symbol near the terminating node for each terminating line. Thus, conventionally, the terminating node is cluttered with line adornments making viewing very difficult. Here the adornments are grouped near the center of the connecting line, allowing more information to be included in the adornment.

In one implementation, the user is not allowed to adjust positioning of the line adornments. In another implementation, it is contemplated that the tool automatically adjusts the adornments to the best position based upon diagram real estate. In yet another embodiment, it is further contemplated that the user is allowed to select (either by group or separately) and drag an adornment along the associated line to the desired position.

The diagrams presented by the designer tool illustrate the natural tree structure of the underlying graphs, an attribute indicated at 310. Diagrams can depict, for example, a grammar, object model, domain model, meta-model, or a schema. Different diagrams can be drawn that include the overall treelike structure or subtrees thereof, referred to as an instance diagram. The overall treelike structure dictates the shape the instance diagram will have. UML provides an overall arbitrary rendering of boxes and lines that would look nothing like the structure of the instance. Thus, the designer tool of the subject invention helps the language designer better understand what the diagram is indicating.

Another attribute of the designer tool is that editing is straightforward, as indicated at 312. The designer need not waste time with editing the layout of the diagram. In contrast, conventional tools can require that the user decide how a node connects, the arrangement of the node and lines in relation to other nodes, etc.

At 314, the tool is scalable such that larger object models can be presented as a single forest (which is a collection of trees), and in most cases, in a single diagram. The designer tool is economic, with repetition of symbols and nodes. Nodes can be added or appended to an existing tree branch, essentially shoving new nodes down and across the tree without adding confusion. Conventionally, unstructured graphs expand in a chaotic way as more lines and nodes are added. The tool of the subject invention takes advantage of GUI features and extends these diagrams is an efficient manner. The tool provides scrollbars, window resizing, and pagination for printing, for example, to make user interaction more efficient and productive.

Another attribute is that the designer tool presents a coherent structure that captures the tree structure of both the underlying inheritance and relationship graphs, as indicated at 316.

Figure 4:
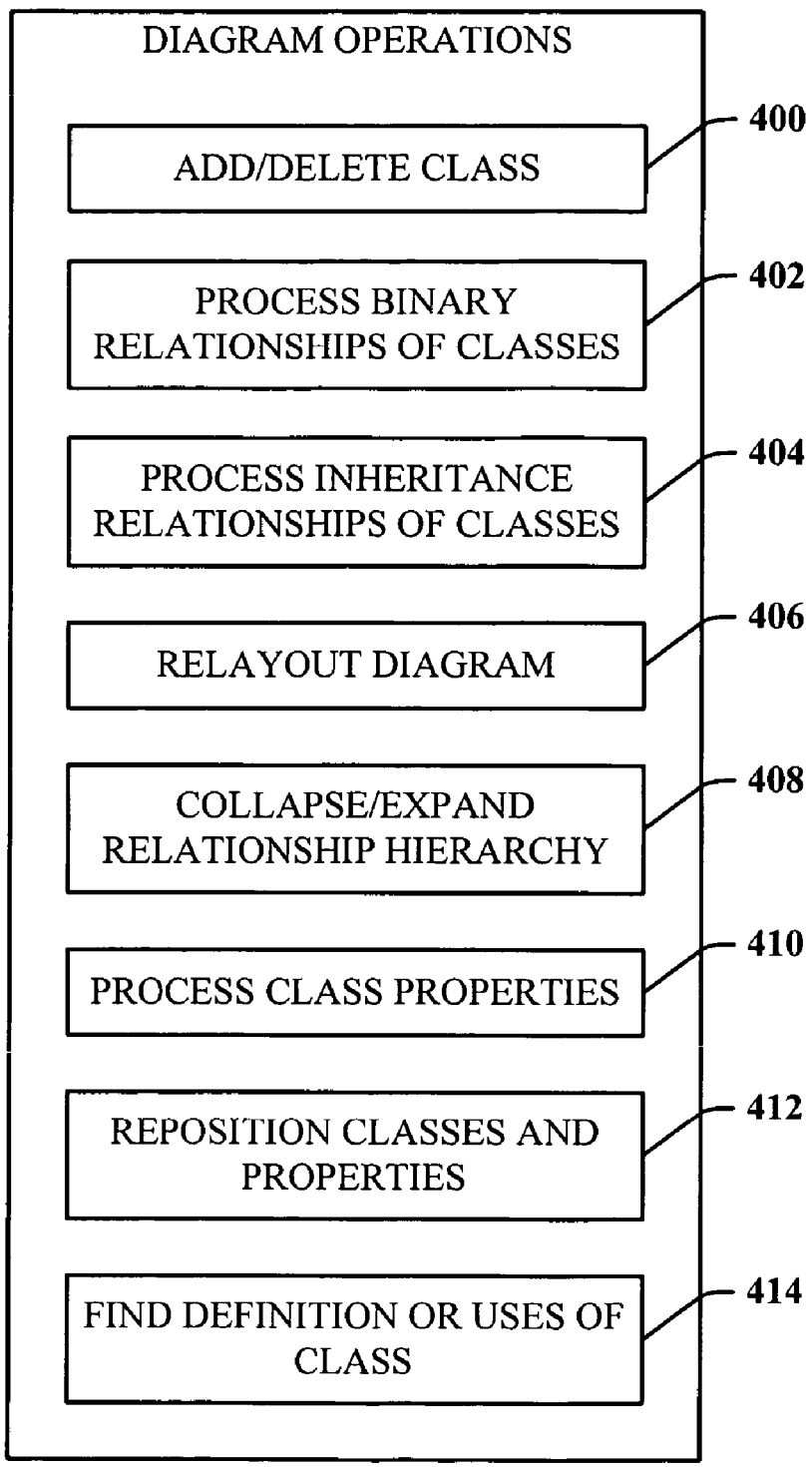
FIG. 4 illustrates operations that can be performed using the designer tool of the subject invention.

FIG. 4 illustrates operations that can be performed using the designer tool of the subject invention. At 400, objects (e.g., classes) can be added or deleted. Although the description refers to class objects, it is to be appreciated that these operations can be performed on any type of object. A new class can be added at the left of the structure below any of the existing classes. When deleted, a class and all of its associated relationships are removed from the structure.

At 402, the tool can process operations on binary relationships of classes. A binary relationship can be added between existing classes. Relationships are directional. The relationship is drawn using a line from the source node (or class) to the target node (or class), in an "L" shape under the source class. The line is channeled with any other relationship lines from the source class. An embedding of the target class is displayed at the other end of the relationship. A binary relationship can also be added between an existing class and the structure background. A new target class is created and a new relationship created between the source and target classes.

When a relationship is deleted, it is removed from the structure. All other structure elements remain in position. It should be noted, however, that a tidying operation can be performed which initiates a relayout operation that can restructure the tree to a more efficient depiction.

The relationship operations also include switching an embedding relationship to a reference relationship, and switching a reference relationship back to an embedding relationship, subject to constraints on the multiplicity. An embedding parent has a maximum multiplicity of one. This can either drive the user interaction, preventing the creation of an invalid diagram, or can be detected by a subsequent validation step. Additionally, a definition and an embedding relationship can be swapped for the same class.

At 404, inheritance relationships of classes can be processed. An inheritance relationship can be added between existing classes. Note that inheritance relationships are constrained to be non-cyclic, either during editing or subsequently. Usage of a child class is shown at the head of an inheritance arrow underneath a parent class. An inheritance relationship can be added between an existing class and the diagram background. A new child class is created together with the inheritance relationship. An inheritance relationship can also be deleted, and once performed, the relationship is removed from the structure. All other structure relationships remain.

As indicated infra, a relayout operation of the structure can be performed, as indicated at 406, which causes all definitions to be moved to an optimal place subject to the current options, and all other depictions of classes to be organized accordingly.

At 408, where the inheritance hierarchy is currently expanded, as indicated by a minus "−" sign in a first twicky, the inheritance hierarchy can be collapsed by selecting the first twicky. The complete inheritance hierarchy under the class is collapsed, and replaced by a "+" sign in the twicky. The collapsed inheritance hierarchy can be expanded by then selecting the first twicky.

Where previously expanded, as indicated by a second twicky with a minus "−" sign, a relationship hierarchy can be collapsed by clicking on the second twicky. The complete hierarchy reached via that relationship is collapsed, and the second twicky replaced by a "+" sign. The relationship hierarchy can then be expanded by selecting the second twicky when showing a plus "+" sign.

At 410, object properties can also be processed. Properties of a class can be exposed in an attached "flap" by selecting a third twicky, when the twicky indicates a minus sign. When the property flap is open, the type and name of a property are shown in the flap. The property flap disappears when again selected, and the third twicky shows a "+" sign. Additionally, when a mouse pointer is hovered over the class object, e.g., in an area directly above where the property flap would be exposed, the property flap is temporarily opened. A property can also be added to a class and delete from a class such that the property either appears or does not appear when the flap is opened.

At 412, classes and properties can be repositioned. A class adjacent to the left of the diagram can be selected and repositioned vertically. This moves the object to a new position in the top-to-bottom order of the structure. Additionally, a class object appearing as a target node of an embedding or reference relationship can be repositioned vertically by dragging the node within the set of relationships of the source class. Other methods are also possible, e.g., move later, move earlier, move first, move last and move here. A class node appearing as a child of an inheritance relationship can be repositioned vertically by dragging the node within the set of children of the source class. Other methods are also possible, e.g., move later, move earlier, move first, move last and move here. In an other operation, a property within a property flap can be selected and repositioned vertically by dragging the selected property within the listed properties of that class object. Other methods are also possible, e.g., move later, move earlier, move first, move last and move here.

At 414, the tool facilitates an operation of searching. A definition or use of a class can be searched, given one of its uses, by at least two methods. Firstly, select any depiction of a class, and then invoke an operation to highlight its definition, and scrolling the presentation, if necessary. Secondly, show a "side link", which is a group of lines at the right-hand side of the diagram that link the definition of a selected class object or class objects to respective uses. A side link appears temporarily at the right-hand side of the diagram, as the user hovers the mouse pointer over a use, and directs the user between the reference to the definition. This takes advantage both of the tree-structured layout, and of the interactive capabilities of the tool.

Figure 5:
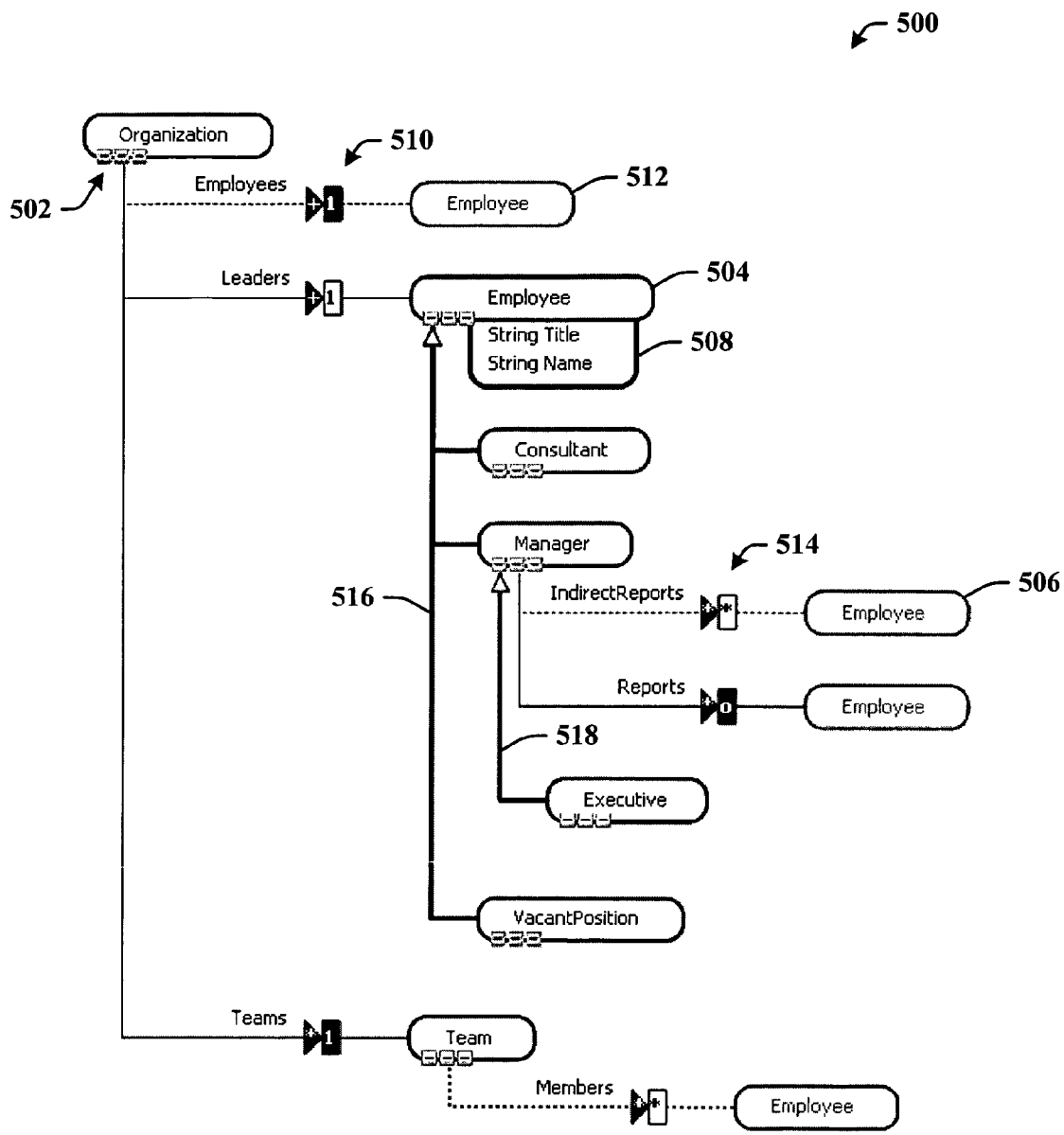
FIG. 5 illustrates a layout of an exemplary treelike structure of classes that constitute an abstract syntax of a language of organization charts in accordance with the invention.

FIG. 5 illustrates a layout of an exemplary treelike structure 500 of classes that constitute an abstract syntax of a language of organization charts in accordance with the invention. Given the initial user input of the class objects Organization, Employee, Team, where employees are of several types: Consultant, Manager, Executive, and VacantPosition. The tool automatically draws interconnecting lines to one another according to the predefined relationships, resulting in automatically generated structure 500.

The structure 500 begins with the root class object "Organization" in the upper leftmost position. In this implementation, each node includes three small twicky symbols 502 along the bottom edge that facilitate performing expand/collapse operations on the associated node. In this case, the first and leftmost twicky (denoted by a symbol similar to [−]) allows expanding and collapsing of the inheritance hierarchy; the second (or middle) twicky allows expanding and collapsing of the relationships; and the third (or rightmost) twicky allows expanding and collapsing of a properties flap. It is to be appreciated that a greater number and different representations of such twicky operations can be employed with each node. For example, a fourth twicky (of a circular geometry) can be provided to expose user comments associated with the node or metadata such as when the node was last modified. Alternatively, a fewer number of twicky symbols can be provided, but which are multifunctional, in that keystroke combinations, or a mouse pointer in combination with a right click, for example, invoke different operations from the same twicky.

In this example, the relationships hierarchy is expanded, since the second twicky has been selected for expansion. Emanating from the root node are the Employee and Team nodes, which are connected to the Organization root node using the line channeling technique to define relationships and inheritances that correspond to the underlying relationship and inheritance graphs.

The Organization class node is connected at a single point by taking advantage of the line channeling capabilities of the subject invention, which is contrary to conventional tools, such as UML. Moreover, the line adornment labels of Employees, Leaders, and Teams are conventionally provided at the ends of the lines, so touching a target node with the lines would have to occur at different points on the target node creating a potentially confusing rendition of text and objects at that node.

Notice on the diagram that there are several node bubbles labeled Employee. The branches Employees, Leaders and Teams from the root node each have an Employee node. The design tool of the subject invention automatically places an Employee node where the definitional Employee class is defined (i.e., the case 504 where the Employee node is bolded). In support of eliminating line crossings, other nodes in the structure 500 that only refer to the definitional Employee class 504 are indicated by an unbolded (or grayed) node or graphic, for example, an Employee node 506. As used herein, the terms definitional and non-definitional apply to nodes, and the terms embedding and reference apply to arcs. There are also operations provided by the tool for bringing the definition from somewhere else to a non-definitional node, and for creating a root node at the location to where the definitional node is moved. These features provide greater control over the layout without the need to do additional work.

Notice that under the main definitional Employee node 504, a property flap 508 is depicted which exposes attribute properties called String Title and String Name. In this example, the definitional Employee node 504 is defined in association with these two properties. A greater or lesser number of properties can be employed and exposed in the property flap 508. This simply means that each employee has a title and a name. By default, when the user chooses to look at the overall structure of the grammar, the property flaps are not exposed. Thus, in one implementation, the user must select the third (or right) twicky to expose the associated properties. In another implementation, when the user hovers the mouse pointer over the third twicky symbol, the properties flap appears temporarily to expose the properties. The properties can then be made to appear permanently by selecting the third twicky. Thus, the designer tool facilitates focusing on the aspects that are deemed important to the user when defining the language and treelike structure.

The designer tool employs a role symbol 510 (similar to a "diode" symbol) that provides an explicit representation of the roles of relationships. This is a natural location for the symbol adornment that gives additional meaning to the relationship. For example, a relationship between the root Organization node and a non-definitional Employee node 512 has a role 510 named Employees. This role 510 is marked with plus sign "+" indicating that the organization has one or more Employee instances that play the role called Employees. The inverse role is marked "1" indicating that each Employee is employed by exactly one organization.

The tool also employs diagrammatic conventions (e.g., color density and/or dashed or dotted lines) to distinguish between the definition of a class, the use of a class in an embedding or inheritance relationship, and the use of a class in a referencing relationship. For example, the Employee class 512 is connected via a referencing relationship to the root class Organization 502, as indicated by the interconnecting dashed line. Alternatively, the Employee class 504 is connected via an embedding relationship to the root class Organization 502, as indicated by the interconnecting solid line.

In the example diagram, non-definitional (or usage) class depictions are presented as light grey, while definitional classes are presented as more pronounced (e.g., a dark blue). Definitional and non-definitional class depictions can be definitively differentiated by the absence or presence of twickies, such that a definitional class includes the twickies and the non-definitional class does not. The density of a line can indicate that one relationship is embedding and another is a reference. The difference in different kinds of relationships can be denoted in the example by using dotted lines for reference relationships, for example. It is to be appreciated that these representations can be made according to many differently defined conventions such as colors, line types and thicknesses, and other graphical indicia.

The role symbol filled or unfilled. When generating code (e.g., in C#) from this diagram, if the role symbol is filled in, a property is generated on the class and a method corresponding to the role. The designer tool facilitates showing just the important properties of the relationship that the line represents between, for example, the root node Organization 502 and the referencing node Employee 512. Thus, the depiction of the line ends in association with symbols (e.g., the role symbol) allows the user to present additional properties. Moreover, the fact that these adornments (the label Employees and the role symbol 510) are positioned near the middle of the line, facilitates change of their color and shape to represent several properties of the role itself, since there is plenty of space around them.

A manager can have many employees who report to him or her. In the case of the label IndirectReports, an employee can have indirect reporting to many managers, as indicated by the asterisk in the unbolded box on the right-hand side of the role symbol 514. Underneath is a Reports label and a bolded box with a "0". That means that an employee might or might not report directly to a manager. So in this case, four symbols are used: the "0" for might/might not; the "1" which means always have this relationship; the asterisk "*" means may have any number; and the plus sign "+" means at least one, but might have more.

Note that the definitional Employee node 504 has the first and third twickies selected, the third twicky exposing properties associated therewith. The first twicky expands the inheritance relationships to definitional Consultant node, definitional Manager node and definitional VacantPosition nodes. These are child definitional nodes to the parent Employee node 504, as indicated by the bolded and channeled line 516, and the arrowed end pointing to the parent Employee node 504. Similarly, the inheritance relationship, as expanded by the first twicky of the parent definitional Manager node, exposes a child definitional Executive node, as indicated by the bolded and arrowed end of an interconnecting line 518.

Figure 6:
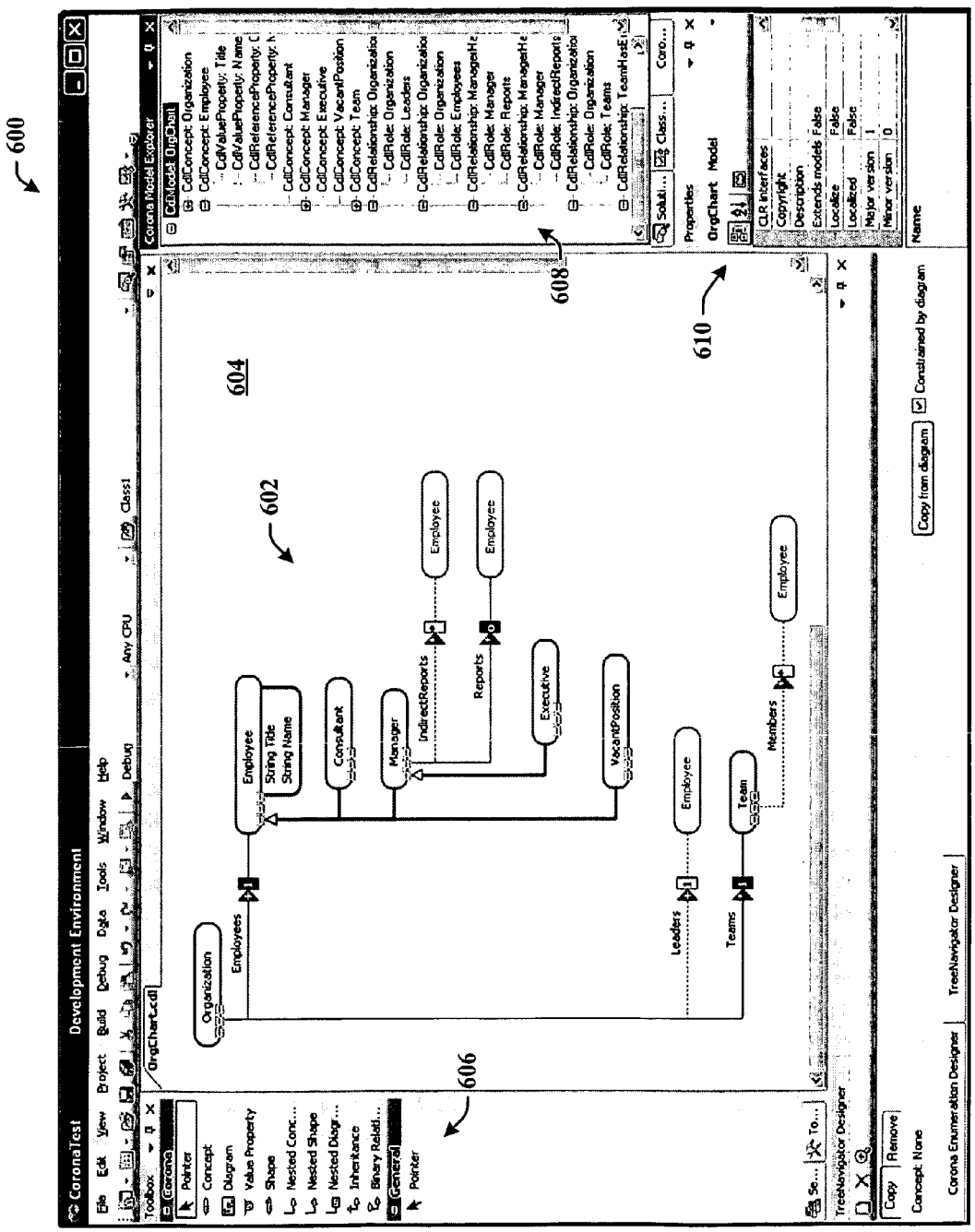
FIG. 6 illustrates a designer screenshot of a treelike structure diagram in accordance with the invention.

Referring now to FIG. 6, there is illustrated a designer screenshot 600 of a treelike structure diagram 602 in accordance with the invention. The central area or workspace 604 of the designer presents the treelike structure diagram 602 to be edited. To the left of the workspace 604 is a toolbox 606 that provides a set of elements which can be dragged onto the workspace 604 and dropped in appropriate places. To the right of the workspace 604 is an explorer 606 that provides an alternative method for viewing the model 602, and a properties grid 610 that shows detailed properties of the selected element.

To better understand operation of the notation, the following definitions are provided to distinguish between the following depictions of classes: Definition—a depiction that shows the complete definition of a class, and of which there is only one; Usage—any non-definitional use, for example, a depiction that shows a class, related by embedding, inheritance or reference, as a child of another class, and of which there can be many such depictions for a given class in a diagram.

When laying out the diagram, the tool automatically determines an optimal position for a definitional class. There are several options for this which are appropriate for different purposes. Often several of these may apply simultaneously; how to prioritize and select these is up to the user of the tool. The options or rules are: show a definition at the top level, to the left of the diagram; when a class is embedded in just one parent, show the definition embedded in the parent; when a class is embedded in an important parent, show the definition embedded in that parent; when a class has a superclass, show the definition as inheriting from the superclass; when a class has an important subclass, show the definition as the superclass of the important subclass; and a class may be determined as "important" by marking it as such.

Vertical order within a group can be explicitly changed by the user. However, one rule can be that initially, it is alphabetical, or derived from an alternative calculation selected by the user.

The ability to navigate easily from a non-definitional class to its definition class is also provided. This can be accomplished by forced marking (e.g., highlighting) of all classes associated with the definitional class. For example, when the user selects a non-definitional class, the tool automatically tags or highlights the definitional class, other non-definitional classes, or both. Another example, involves interaction with a grayed usage node, such as Employees, for example. If a user wants to be taken to the corresponding definitional Employee node, one way is to hover the mouse pointer thereover, present a menu, select the option, and arrive at the desired point.

Another way is to present the side links when the user hovers above a usage, which side links direct the user's eye to the definitional object. In one embodiment, the user can replace the gray non-definitional nodes with actual links that take the user to the definitional object. In another implementation, the grayed non-definitional nodes are employed with the side links. In yet another implementation, the side links can be enabled temporarily for 3-5 seconds, for example, to assist the user in finding the definitional node.

Highlighting or other graphical indications can also be employed to indicate the propagation of delete information, as just one example. For example, when the user has selected a node for deletion, highlighting can be imposed on the selected node and all associated nodes, lines and other relational objects and symbols to provide feedback to the user of the effect of deleting the selected node or object. In another example, assume the technique is being used to depict the whole-part structure of animated figures. Then propagation of movement plays an important role. In yet another example that depicts the design of a car, propagation of color is an important feature. In general, various kinds of information can be propagated along arcs.

Figure 7:
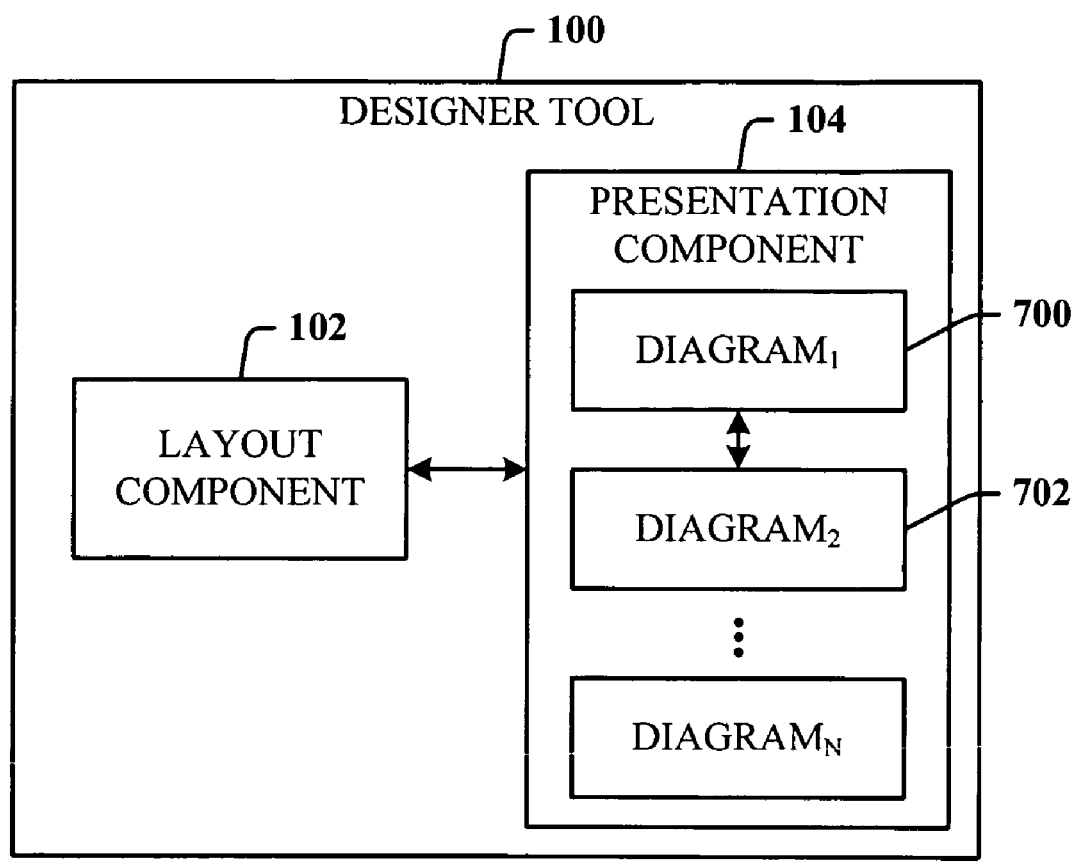
FIG. 7 illustrates the presentation of the treelike structure as multiple diagrams in accordance with the invention.

FIG. 7 illustrates the presentation of the treelike structure as multiple diagrams in accordance with the invention. The tool 100 also facilitates the processing of larger structures such that presentation thereof is more convenient when using multiple diagrams. The layout component 102 processes the input as before, and outputs the structure to the presentation component 104. Thereafter, the presentation component 104 processes the received structure and determines how to present the structure as a diagram in the tool. In this scenario, the structure is presented as multiple diagrams (denoted as $DIAGRAM_1, DIAGRAM_2, \ldots, DIAGRAM_N$). The structure can be presented in two separate diagrams, for example, a first diagram 700 and a second diagram 702.

Presentation options or rules can include, by example, but not by limitation, inheritance and relationship hierarchies can be shown separately on different areas of the diagram, or different diagrams. Further sub-options can include: all class definitions appear on the relationship hierarchy and the inheritance hierarchy only includes usages of classes: within the relationship hierarchy, relevant earlier options apply; and all class definitions appear on the inheritance hierarchy, and the relationship hierarchy only includes usages and references.

In a more robust implementation, the presentation component 104 communicates with the layout component 102 to analyze and coordinate structuring of the treelike structure by layout component 102. For example, if a preliminary "screenshot" of the structure during preparation by the layout component 102 is transmitted to the presentation component 104, and the presentation component 104 processes the screenshot and estimates that the preliminary layout will require five separate diagrams, such information can be fed back to the layout component 102 to restructure the tree to reduce the number of diagram required for presentation. Further optimizations related to such features will be described infra with respect to implementation of an artificial intelligence (AI) component.

The designer tool also supports nominating a particular class to be the focus of attention on a particular diagram or area of the diagram. This is accomplished by marking or tagging the focus class and related classes as important, and applying the options above in a chosen priority.

Figure 8:
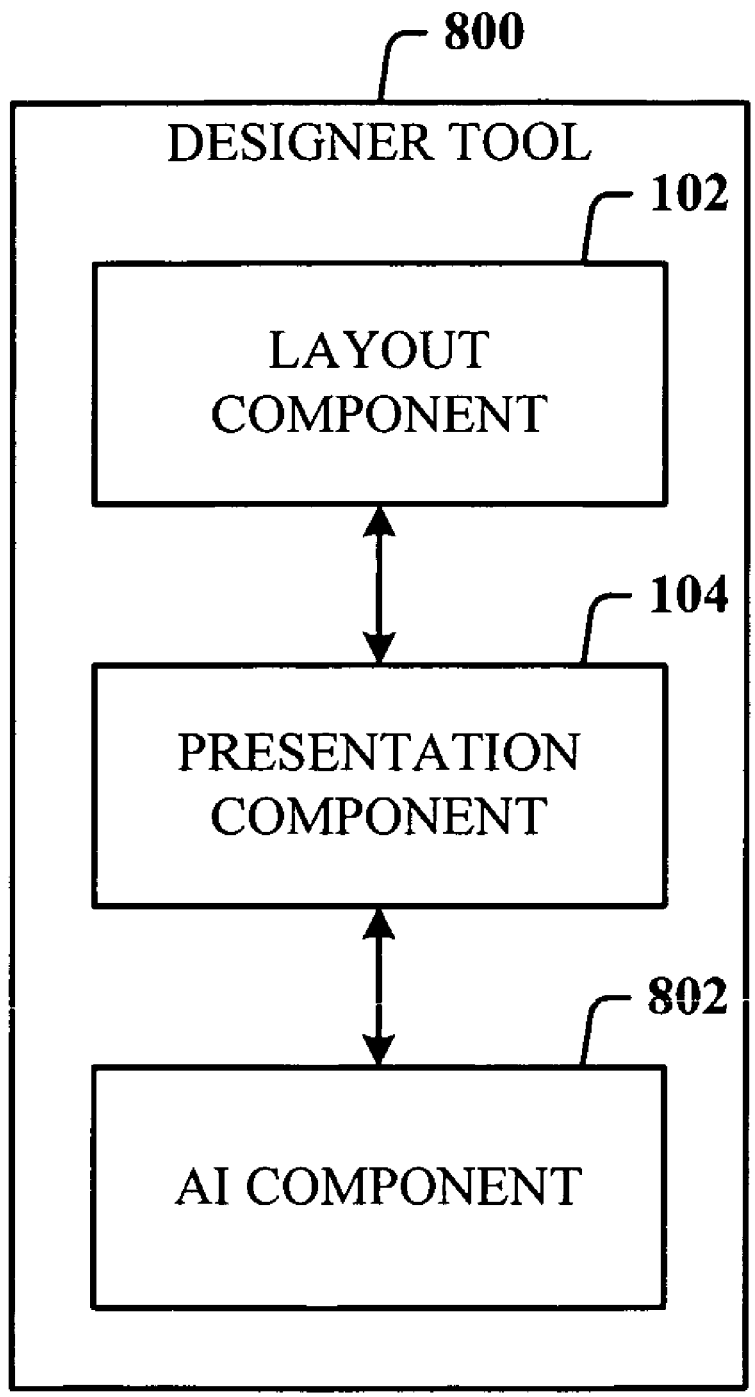
FIG. 8 illustrates a designer tool system that employs an artificial intelligence component that facilitates automation of one or more learned features of the methodology of the invention.

FIG. 8 illustrates a designer tool system 800 that employs an AI component 802 that facilitates automation of one or more learned features of the methodology of the invention. The subject invention (e.g., in connection with selection) can employ various AI-based schemes for carrying out various aspects thereof. For example, a process for determining how a given user prefers to have the treelike structure presented as a diagram can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to the following.

In one implementation, the AI component 802 facilitates determining according to a predetermined criteria how many diagrams into which to divide the structure for presentation. This can be based on the type of data employed in the structure. For example, in a shared environment where several developers are working on the same file, each focusing on different aspects thereof, and if the treelike structure employs a large organizational chart of various teams and functions, the resulting diagrams can be determined based on a given focus of a developer. If the focus of a first developer is financial, input to the tool of the first developer login information or a financial term, for example, will automatically cause the tool to restructure (expansion and contraction, for example) the tree for emphasis on financial aspects of the structure when creating the presentation diagrams.

Along the same lines of automation, the tree can be restructured for presentation with focus centered on a particular class object related to login information or other input terms. If a second developer is working on a class object associated with management, metadata tagged to the class object can be used to automatically open the model file to that location of that second developer based on certain input data.

The AI component 802 is suitably designed such that the tool can learn, for example, user preferences by observing layout choices that the user makes over time, and applying similar relayout algorithms during future interactions by that user. Different users may have different preferences for layout rules.

Additionally, various automatic relayout or tidying algorithms can be learned. When the user first lays out a diagram, this can be automatic by default. Thereafter, a tidying option can be selected for final tidying-up of the structure. Additionally, there can be rules employed to enable this tidying up. One user may prefer one set of rules over another set. Moreover, this can be imposed at the diagram level to make the diagram more compact in real estate. For example, the tool, as assisted by the AI component 802, can learn to move objects into white space according to previous user movements, or according to a cost analysis determination that balance the cost of moving the object versus the presentation thereof, for example.

Figure 9:
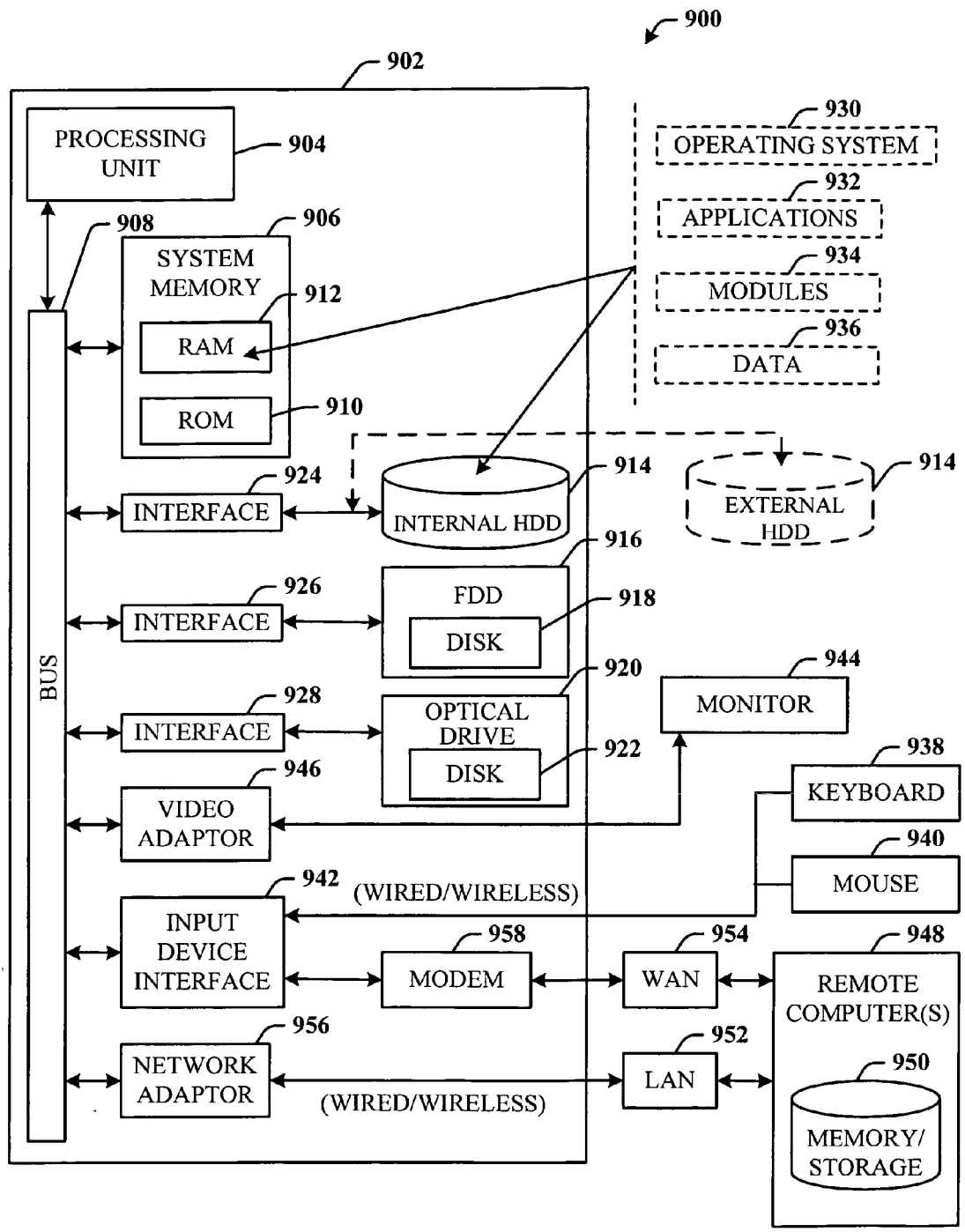
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, micro-processor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies, for example. Other external drive connection technologies are within contemplation of the subject invention.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. Tnese and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
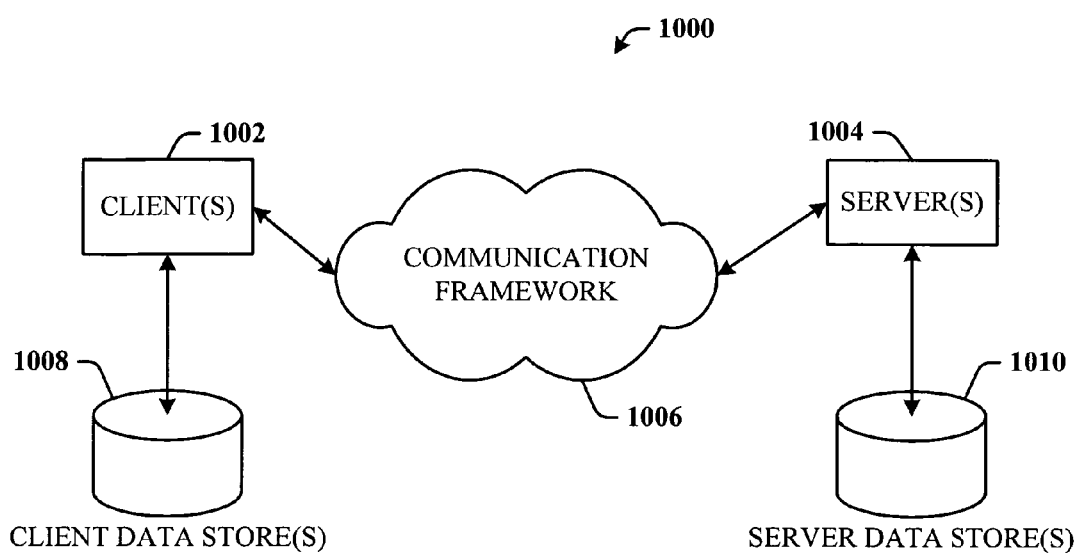
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations.by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system, having a processor communicatively coupled to a memory, that facilitates design of an object model, comprising:

a layout component that receives as input one or more graphs of objects having one or more different kinds of directed relationships, and converts the one or more graphs into an editable treelike structure comprising one or more nodes corresponding to the received graph of objects, wherein at least one of the nodes includes a plurality of changeable graphical symbols displayed on the node that are configured to change graphics upon activation, and wherein, upon activation of a first changeable graphical symbol, the first changeable graphical symbol dynamically expands to display one or more previously unseen inheritance hierarchy graph objects or collapses to hide one or more previously displayed inheritance hierarchy graph objects, and wherein, upon activation of a second changeable graphical symbol, the second changeable graphical symbol dynamically expands to display one or more previously unseen relationship hierarchy graph objects or collapses to hide one or more previously displayed relationship hierarchy graph objects;

a presentation component that presents the editable treelike structure and facilitates user interaction therewith, the user interaction comprising:

receiving inputs from a user that actuate at least one of the displayed changeable graphical symbols to expand or collapse inheritance hierarchy or relationship hierarchy graph objects and further indicate that at least one of the nodes displayed in the editable treelike structure is to be repositioned within the treelike structure;

automatically and dynamically expanding at least a portion of the graph of objects to display one or more previously unseen inheritance hierarchy or relationship hierarchy graph objects or collapsing at least a portion of the graph of objects to hide one or more previously displayed inheritance hierarchy or relationship hierarchy graph objects; and automatically repositioning the node according to the received input, wherein connecting lines attached to the at least one node are automatically adjusted to an optimal position determined based on the structure's real estate; and wherein highlighting or other graphical indications automatically indicate the propagation of future user actions from a selected node of the treelike structure through other nodes having directed relationships to said selected node.

2. The system of claim 1, wherein the layout component automatically adjusts characteristics associated with graphical symbols of the treelike structure, which characteristics include at least one of spacing, position, size, and shape.

3. The system of claim 1, wherein the layout component automatically assesses presentation real estate and adjusts the treelike structure for viewing.

4. The system of claim 1, wherein the layout component facilitates the input of lines, none of which cross one another.

5. The system of claim 1, wherein the layout component facilitates expansion and contraction of all or portions of the treelike structure.

6. The system of claim 1, wherein the layout component facilitates placement of a graphical indicia that is an adornment, which placement is spatially distinct of other graphic indicia of the treelike structure.

7. The system of claim 1, wherein the treelike structure includes class objects.

8. The system of claim 1, wherein the layout component facilitates use of diagrammatic conventions to distinguish between at least one of a definition of a class object, a usage of a class object in an embedding or an inheritance relationship, and usage of the class object in a referencing relationship.

9. The system of claim 1, wherein the layout component facilitates highlighting of all depictions of a given object of the treelike structure and highlighting to indicate propagation of information along an arc.

10. The system of claim 1, wherein the layout component facilitates navigation between a non-definitional symbol of a class object to an associated definitional symbol.

11. A computer readable storage medium having stored thereon computer executable instructions for carrying out the system of claim 1.

12. A method of processing an object model located on a computer readable storage medium, the method comprising:

receiving a directed relationship of class objects;

processing the directed relationship into a tree structure that depicts at least relationships and properties of the class objects, the tree structure comprising one or more nodes corresponding to the received graph of objects, wherein at least one of the nodes includes a plurality of changeable graphical symbols displayed on the node that are configured to change graphics upon activation, and wherein, upon activation of a first changeable graphical symbol, the first changeable graphical symbol dynamically expands to display one or more previously unseen inheritance hierarchy graph objects or collapses to hide one or more previously displayed inheritance hierarchy graph objects, and wherein, upon activation of a second changeable graphical symbol, the second changeable graphical symbol dynamically expands to display one or more previously unseen relationship hierarchy graph objects or collapses to hide one or more previously displayed relationship hierarchy graph objects;

presenting the tree structure as a diagram that is interactive, the user interaction comprising receiving inputs from a user that actuate at least one of the displayed changeable graphical symbols to expand or collapse inheritance hierarchy or relationship hierarchy graph objects and further indicate that at least one of the nodes displayed in the editable treelike structure is to be repositioned within the treelike structure, automatically and dynamically expanding at least a portion of the graph of objects to display one or more previously unseen inheritance hierarchy or relationship hierarchy graph objects or collapsing at least a portion of the graph of objects to hide one or more previously displayed inheritance hierarchy or relationship hierarchy graph objects and automatically repositioning the node according to the received input, wherein connecting lines attached to the at least one node are automatically adjusted to an optimal position determined based on the structure's real estate; and automatically highlighting or otherwise automatically graphically indicating indicate the propagation of future user actions from a selected node of the treelike structure through other nodes having directed relationships to said selected node.

13. The method of claim 12, further comprising depicting the class objects with associated symbols that facilitate, expanding and collapsing an inheritance hierarchy of the tree structure;

expanding and collapsing relationships of the tree structure; and exposing and hiding property information of the class objects.

14. The method of claim 12, further comprising providing diagrammatic conventions that, distinguish a particular class object as a definitional class;

distinguish usage of a particular class object in at least one of an embedding relationship and an inheritance relationship; and expose and hide a property of a particular class object.

15. The method of claim 12, further comprising channeling of multiple lines into a single line of the tree structure that connect to a particular class object at a single point.

16. The method of claim 12, further comprising presenting explicit representative symbols in the tree structure of a role relationship.

17. The method of claim 12, further comprising navigating between a non-definitional class object and a definitional class object.

18. The method of claim 12, further comprising highlighting all nodes that represent the same class.

19. The method of claim 12, further comprising highlighting a portion of the tree structure that indicates propagation of a property across a relationship.

20. A system, having a processor communicatively coupled to a memory, that facilitates development of a class diagram, the system comprising:

means for receiving a graph that comprises objects having one or more directed relationships;

means for processing the graph into a default tree structure that depicts object relationships and object properties, wherein at least one of the nodes includes a plurality of changeable graphical symbols displayed on the node that are configured to change graphics upon activation, and wherein, upon activation of a first changeable graphical symbol, the first changeable graphical symbol dynamically expands to display one or more previously unseen inheritance hierarchy graph objects or collapses to hide one or more previously displayed inheritance hierarchy graph objects, and wherein, upon activation of a second changeable graphical symbol, the second changeable graphical symbol dynamically expands to display one or more previously unseen relationship hierarchy graph objects or collapses to hide one or more previously displayed relationship hierarchy graph objects;

means for presenting the default tree structure as an interactive diagram that facilitates user editing, the user interaction comprising:

receiving an input from a user indicating that at least one of the nodes displayed in the editable treelike structure is to be repositioned within the treelike structure and further actuating at least one of the displayed changeable graphical symbols to expand or collapse inheritance hierarchy or relationship hierarchy graph objects;

automatically repositioning the node according to the received input, wherein connecting lines attached to the at least one node are automatically adjusted to an optimal position determined based on the structure's real estate; and automatically and dynamically expanding at least a portion of the graph of objects to display one or more previously unseen inheritance hierarchy or relationship hierarchy graph objects or collapsing at least a portion of the graph of objects to hide one or more previously displayed inheritance hierarchy or relationship hierarchy graph objects;

means for reordering the default tree structure into a new tree structure by moving one or more of the objects;

means for optimizing presentation of the new tree structure based on a position of a definitional object;

means for rendering the optimized presentation as one or more interactive diagrams; and means for automatically highlighting or otherwise automatically graphically indicating indicate the propagation of future user actions from a selected node of the treelike structure through other nodes having directed relationships to said selected node.

* * * * *